United States Patent
Ray et al.

(10) Patent No.: US 10,860,583 B2
(45) Date of Patent: Dec. 8, 2020

(54) OPTIMIZING WINDOW JOINS OVER DATA STREAMS BASED ON MODEL TOPOLOGIES

(71) Applicant: Hewlett Packard Enterprise Development LP, Houston, TX (US)

(72) Inventors: Medhabi Ray, Palo Alto, CA (US); Maria G. Castellanos, Sunnyvale, CA (US)

(73) Assignee: MICRO FOCUS LLC, Santa Clara, CA (US)

( * ) Notice: Subject to any disclaimer, the term of this patent is extended or adjusted under 35 U.S.C. 154(b) by 526 days.

(21) Appl. No.: 15/034,513

(22) PCT Filed: Jan. 30, 2014

(86) PCT No.: PCT/US2014/013773
§ 371 (c)(1),
(2) Date: May 4, 2016

(87) PCT Pub. No.: WO2015/116088
PCT Pub. Date: Aug. 6, 2015

(65) Prior Publication Data
US 2016/0283554 A1    Sep. 29, 2016

(51) Int. Cl.
*G06F 16/24*     (2019.01)
*G06F 16/2455*   (2019.01)
*G06F 16/2453*   (2019.01)

(52) U.S. Cl.
CPC .... *G06F 16/2456* (2019.01); *G06F 16/24549* (2019.01); *G06F 16/24568* (2019.01)

(58) Field of Classification Search
CPC .................................................. G06F 17/30498
USPC ............................................................ 707/714
See application file for complete search history.

(56) References Cited

U.S. PATENT DOCUMENTS

| | | | |
|---|---|---|---|
| 5,812,996 A * | 9/1998 | Rubin | G06F 12/0866 707/999.002 |
| 7,480,660 B1 | 1/2009 | Black | |
| 7,890,649 B2 | 2/2011 | Gu et al. | |
| 7,991,766 B2 | 8/2011 | Srinivasan et al. | |
| 8,073,826 B2 | 12/2011 | Srinivasan et al. | |
| 2007/0288635 A1 * | 12/2007 | Gu | G06F 16/24568 709/226 |
| 2008/0016095 A1 * | 1/2008 | Bhatnagar | G06F 16/90335 707/999.101 |

(Continued)

OTHER PUBLICATIONS

Avnur, R. and Hellerstein, J. M. (2000). Eddies; Continuously adaptive query processing. In Proceedings of the 2000 ACM SIGMOD International Conference on Management of Data, pp. 261-272, Dallas, Texas, USA.

(Continued)

*Primary Examiner* — Pierre M Vital
*Assistant Examiner* — Andrew N Ho

(57) ABSTRACT

Optimizing window joins over data streams can include receiving an input topology and calculating costs of computing a join of data streams based on a number of model topologies, and determining an optimal topology based on the calculated costs and the input topology, wherein the input topology, the model topologies, and the optimal topology each include a number of interconnected operators.

14 Claims, 5 Drawing Sheets

(56) References Cited

U.S. PATENT DOCUMENTS

| | | | |
|---|---|---|---|
| 2009/0281987 A1* | 11/2009 | Krishnamoorthy | G06F 16/2471 707/999.002 |
| 2009/0319687 A1 | 12/2009 | Goldstein et al. | |
| 2012/0124233 A1* | 5/2012 | Gedik | H04L 49/90 709/231 |
| 2012/0179809 A1* | 7/2012 | Barsness | G06F 16/24568 709/224 |
| 2013/0346390 A1* | 12/2013 | Jerzak | G06F 16/24568 707/719 |
| 2014/0006384 A1* | 1/2014 | Jerzak | G06F 16/144 707/719 |

OTHER PUBLICATIONS

Hammad et al, "Optimizing In-order Execution of Continuous Queries over Streamed Sensor Data", 2006.

Kang, J et al, "Evaluating Window Joins Over Unbounded Streams", Apr 23, 2002.

Sax, et al., "Streaming System Performance Optimization", U.S. Appl. No. 13/705,952, filed Dec. 5, 2012.

Srivastava, et al., "Memory-Limited Execution of Windowed Stream Joins", Proceedings of the 30th VLDB Conference: The 30th international Conference on Very Large Databases (VLDB), Aug. 31-Sep. 3, 2004, Toronto, Canada, 12 pages.

Tao, Y., Yiu, M. L., Papadias, D., Hadjieleftheriou, M., and Mamoulis, N. (2005). RPJ: Producing fast join results on streams through rate-based optimization. In Proceedings of the 2005 ACM SIGMOD International conference on Management of Data, pp. 371-382, Baltimore, Maryland, USA.

* cited by examiner

OPTIMIZING WINDOW JOINS OVER DATA STREAMS BASED ON MODEL TOPOLOGIES

BACKGROUND

Data can be sent and/or received as a data stream. A data stream can include a continuous stream of data that can be sent tuple-by-tuple. Further, data streams can include distributed computer processing platforms to process the data in a real-time manner.

DETAILED DESCRIPTION

Figure 1:
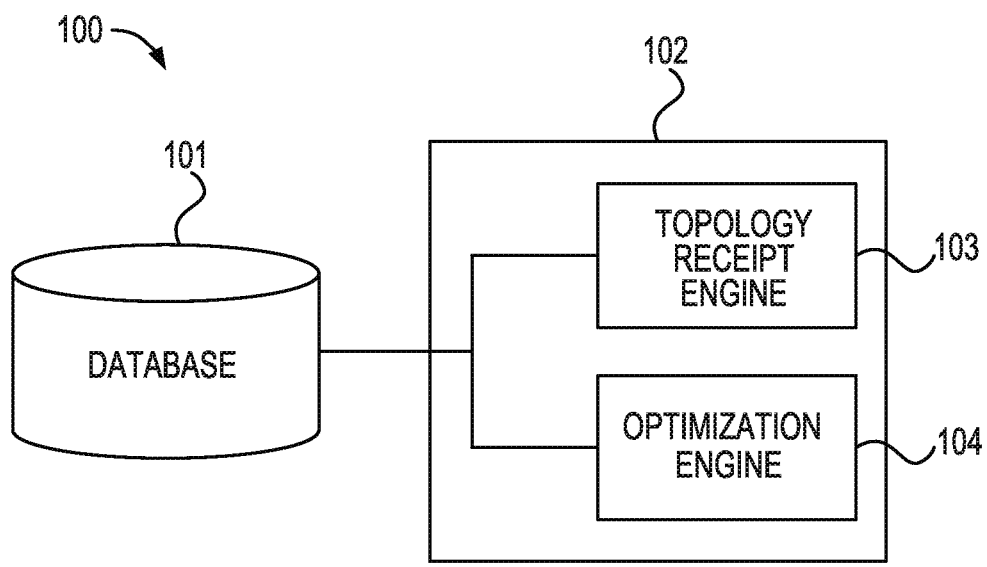
FIG. 1 illustrates a diagram of an example of a system for optimizing window joins over data streams according to the present disclosure.

Due to the popularity of applications that process data in real-time or near-real-time, use of streaming systems has increased. Steam processing systems can receive one or more incoming streams of data, process them and output one or more streams of data. Stream processing systems can be deployed in a distributed manner, such that the workload can be partitioned and portions of data can be processed in parallel (e.g., substantially simultaneously). Such systems can be referred to as parallel distributed streaming streams.

Data streams can often have a high incoming rate of data, and real-time responses to queries from users are often expected. Sufficient central processing unit (CPU) resources and memory may not be available to process queries (e.g., requests for information from the streaming system) at a sufficient rate, or to maintain the run-time state required by high volume data streams.

Several approaches have been studied to handle high volume data streams in real-time. While some have proposed spilling tuples to disk to handle high volume stream joins, others have proposed progressive computations over streams, where initial results are obtained inaccurately, but are later updated when more tuples stream in. However, these methods often rely upon a number of load reduction techniques to keep up with increasing stream input rates. Furthermore, problems arise when the data rates in a data stream fluctuate over time, or when there is a skew in the distribution of certain attribute values. Various properties of a data stream influence how much computing resources are necessary to compute a query, and many times a single machine is not sufficient to keep up with high data input rates without decreased performance.

One class of operator (e.g., a combination of hardware and programming that is configured to perform a particular function) that has been of interest in stream processing is a window stream operator that defines a scope on an infinite data stream being analyzed. For example a window of 10 minutes denotes that a query is interested in the last 10 minutes of data from the incoming stream. Examples of the present disclosure include windowed join queries that can be used to correlate two incoming streams by an attribute (e.g., value, quality, characteristic, and/or parameter) which is common to the two streams. For example a stream of tweets can be joined with a stream of weather data on a common attribute, such as a location attribute. These windowed join queries can be computed efficiently over high volume streams using parallel distributed streaming systems. Examples of the present disclosure can be flexibly adapted to different environments where computing, network and memory costs have different degrees of importance. For example, for an application where contention for the network is not a concern, a low weight can be assigned to the network cost in relation to the weight assigned to computing and memory costs. In some examples of the present disclosure, a windowed join query can be computed using different types of stream splitting strategies. Further, a unit-time-basis cost model can be used to evaluate a join query using the different stream splitting strategies. Using this cost model, an optimal strategy can be selected, which minimizes the join processing time, network costs and buffer requirements to compute a particular query.

Figure 2:
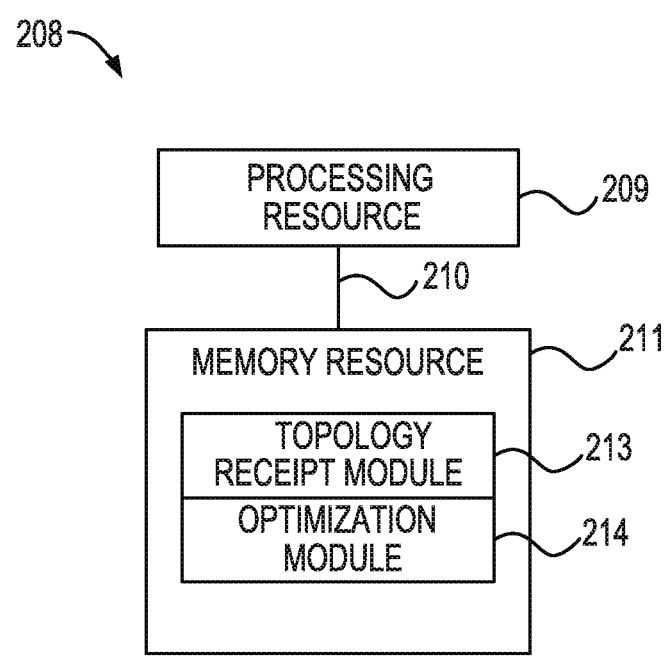
FIG. 2 illustrates a diagram of an example computing device according to the present disclosure.

FIGS. 1 and 2 illustrate examples of systems 100, 208 according to the present disclosure. FIG. 1 illustrates a diagram of an example of a system 100 for optimizing window joins over data streams according to the present disclosure. The system 100 can include a database 101, a window join optimization system 102, and/or a number of engines 103, 104. The window join optimization system 102 can be in communication with the database 101 and/or a stream application programming interface (API) via a communication link, and can include the number of engines (e.g., topology receipt engine 103 and optimization engine 104). The window join optimization system 102 can include additional or fewer engines than illustrated to perform the various functions described herein.

The number of engines 103, 104 can include a combination of hardware and programming that is configured to perform a number of functions described herein (e.g., receive an input topology). The programing can include program instructions (e.g., software, firmware, etc.) stored in a memory resource (e.g., computer readable medium (CRM), machine readable medium (MRM), etc.) as well as hard-wired program (e.g., logic).

In some examples, a window join optimization system 102 can include a combination of hardware and programming that is configured to produce an optimal topology. As used herein, a topology includes a configuration for a number of window stream operators to be executed on a parallel distributed streaming system. An optimal topology can include a topology that includes a lowest cost for performing a windowed stream join, as discussed further herein.

A parallel streaming system can receive data in the form of a stream of tuples. As used herein, a tuple can include a piece of data. A "join operator" can be used to relate two or more tuples by specifying a condition on a particular attribute, which is common in both the tuples. As used herein, an operator can include a combination of hardware and programming that is configured to perform a particular function. For instance, a join operator can include a combination of hardware and programming that is configured to perform a join function (e.g., identifying and joining all tuples satisfying a number user-specified join conditions). For example, a data stream including a stream of events from traffic sensors and a data stream containing information from a number of weather monitor sensors, can be joined based on location (e.g., the common attribute between the two streams) to predict the probability of accidents due to bad weather conditions in real time.

Further, the window join optimization system 102 can include a combination of hardware and programming that is configured to perform a windowed stream join between a number of streams within the parallel streaming system. A window (e.g., a user-configurable definition of boundaries of a subset of a data stream) can restrict the number of tuples that can be stored in memory from each stream. For instance, a window can include a tuple-based window, wherein the tuple-based window is a window defined by an integer (e.g., 8) denoting that the preceding 8 tuples in the stream belong to the current window. Similarly, a window can include a time-based window, wherein the time-based window is a window defined by a period of time, such that given a unit of time (e.g., 10 minutes), the preceding tuples which arrived in the last 10 minutes belong to the current window. Further, a windowed join (e.g., a calculation and/or model (e.g., algorithm) that identifies correlating information between a plurality of streams) can identify data from each of a number of streams that satisfy a join operation.

For example, a window join can take as input two streams of tuples, (e.g., stream S1 and stream S2) along with window sizes for both, and identify correlating information (e.g., a number of tuples) between the two streams. The output of the join can contain every pair of tuples from streams S1 and S2 that satisfy the join predicate and are simultaneously present in their respective windows. As used herein, a window size can include a specified (e.g., user-configurable) time period, and/or a specified number of tuples. However, examples are not so limited, and a window size can include any unit of measurement of a subset of a data stream. For instance, a windowed join can be expressed in Continuous Query Language (CQL) as follows:

Query 1:
SELECT count (A.*)
FROM
Twitter A WINDOW 1 min., Weather B WINDOW 1 hour
WHERE A.LocationId=B.LocationId
AND A.hashTag='#feeling_lazy'
AND B.Temperature>90

Query 1 shown above is an example of a windowed stream join query which joins the data from a twitter stream (e.g., "Twitter A") from the last 1 minute (e.g., "WINDOW 1 min.") with the data from a weather stream (e.g., "Weather B") from the last 1 hour (e.g., "WINDOW 1 hour"), In the above example, the two streams are joined by their 'location' attribute (e.g., the join predicate is "LocationId"). Semantically, this query tries to compute the number of users who tweeted with a hashtag '#feeling_lazy' when the temperature of that location rose over 90 degrees. While the join predicate presented in the above example includes a location attribute, examples are not so limited, and a join predicate can include any user-configurable metric (e.g., value, descriptor, range, and/or attribute) to define common data between a plurality of data streams.

The topology receipt engine 103 can include hardware and/or a combination of hardware and programming to receive an input topology. As used herein, an input topology can include a number of interconnected operators, wherein each of the number of interconnected operators performs a particular function and/or operation, and wherein at least one of the interconnected operators performs a join function (e.g., data stream join). An input topology can include a preliminary topology that has not been analyzed by the windowed join optimizer. In a number of examples, a windowed join optimizer can receive the input topology. The functionalities of the windowed join optimizer, as further described herein, can be performed by and/or in conjunction with the optimization engine 104. Further, a number of data stream characteristics (e.g., parameters), such as data stream input rate and/or other data stream statistics, can be received by the windowed join optimizer, and used to determine an optimal topology (e.g., an optimal window join topology), as discussed in relation to the optimization engine 104.

The optimization engine 104 can include hardware and/or a combination of hardware and programming to compute (e.g., determine) multi-dimensional costs of computing the proposed join plan based on a number of model topologies. As used herein a model topology (e.g., a model topology for a windowed stream join) includes a pre-configured topology used to construct an optimal topology for executing a window join. Further, the optimization engine 104 can construct an optimal topology based on the calculated costs. For example, the optimization engine 104 can determine a three-dimensional cost such as a join cost, a network cost, and a buffer cost associated with replacing the join operator(s) in the input topology, with each of the model topologies. As used herein, a join cost (e.g., a join computation cost ($C_J$)) can include a cost, measured in time units, to compute (e.g., execute and/or perform) a particular join for a window. Also, as used herein, a network cost (e.g., network cost ($C_N$)) can include a cost, measured in number of tuples shipped (e.g., transferred), of all data shipping needed for joining one window of tuples. Further, as used herein, a buffer cost (e.g., a buffer capacity ($C_B$)) can include a cost, measured in number of tuples, of an amount of central processing unit (CPU) memory needed while processing one window of tuples. As discussed further herein, a total cost of a join could be computed as a function of the three different costs, expressed as $f(C_J, C_B, C_N)$.

In a number of examples, the optimization engine 104 can include hardware and programming to determine a weighted sum for computing a proposed join of data streams within the input topology using each of the number of model topologies, and the optimal topology can be constructed based on the weighted sum. The weighted sum can represent the total cost of computing (e.g., executing) the join using one of the model topologies, and can be based on the various dimensions of costs. For instance, in a system where buffer capacity is limited, the buffer cost can be given a high weight relative to the weight of the network cost and the join cost.

FIG. 2 illustrates a diagram of an example computing device 208 according to the present disclosure. The computing device 208 can utilize software, hardware, firmware, and/or logic to perform a number of functions described herein. The computing device 208 can be any combination of hardware and program instructions configured to share information. The hardware, for example, can include a processing resource 209 and/or a memory resource 211 (e.g., CRM, MRM, database, etc.). A processing resource 209, as used herein, can include any number of processors capable of executing instructions stored by a memory resource 211. Processing resource 209 may be implemented in a single device or distributed across multiple devices. The program instructions (e.g., computer readable instructions (CRI)) can include instructions stored on the memory resource 211 and executable by the processing resource 209 to implement a desired function (e.g., construct an optimal topology based on calculated costs and an input topology).

The memory resource 211 can be in communication with a processing resource 209. A memory resource 211, as used herein, can include any number of memory components capable of storing instructions that can be executed by processing resource 209. Such memory resource 211 can be a non-transitory CRM or MRM. Memory resource 211 may be integrated in a single device or distributed across multiple devices. Further, memory resource 211 may be fully or partially integrated in the same device as processing resource 209 or it may be separate but accessible to that device and processing resource 209. Thus, it is noted that the computing device 208 may be implemented on a participant device, on a server device, on a collection of server devices, and/or a combination of the user device and the server device.

The memory resource 211 can be in communication with the processing resource 209 via a communication link (e.g., a path) 210. The communication link 210 can be local or remote to a machine (e.g., a computing device) associated with the processing resource 209. Examples of a local communication link 210 can include an electronic bus internal to a machine (e.g., a computing device) where the memory resource 211 is one of volatile, non-volatile, fixed, and/or removable storage medium in communication with the processing resource 209 via the electronic bus.

A number of modules 213, 214 can include CRI that when executed by the processing resource 209 can perform a number of functions. The number of modules 213, 214 can be sub-modules of other modules. For example, the topology receipt module 213 and the optimization module 214 can be sub-modules and/or contained within the same computing device. In another example, the number of modules 213, 214 can comprise individual modules at separate and distinct locations (e.g., CRM, etc.).

Each of the number of modules 213, 214 can include instructions that when executed by the processing resource 209 can function as a corresponding engine as described herein. For example, the topology receipt module 213 can include instructions that when executed by the processing resource 209 can function as the topology receipt engine 103. In another example, the optimization module 214 can include instructions that when executed by the processing resource 209 can function as the optimization engine 104.

Figure 3:
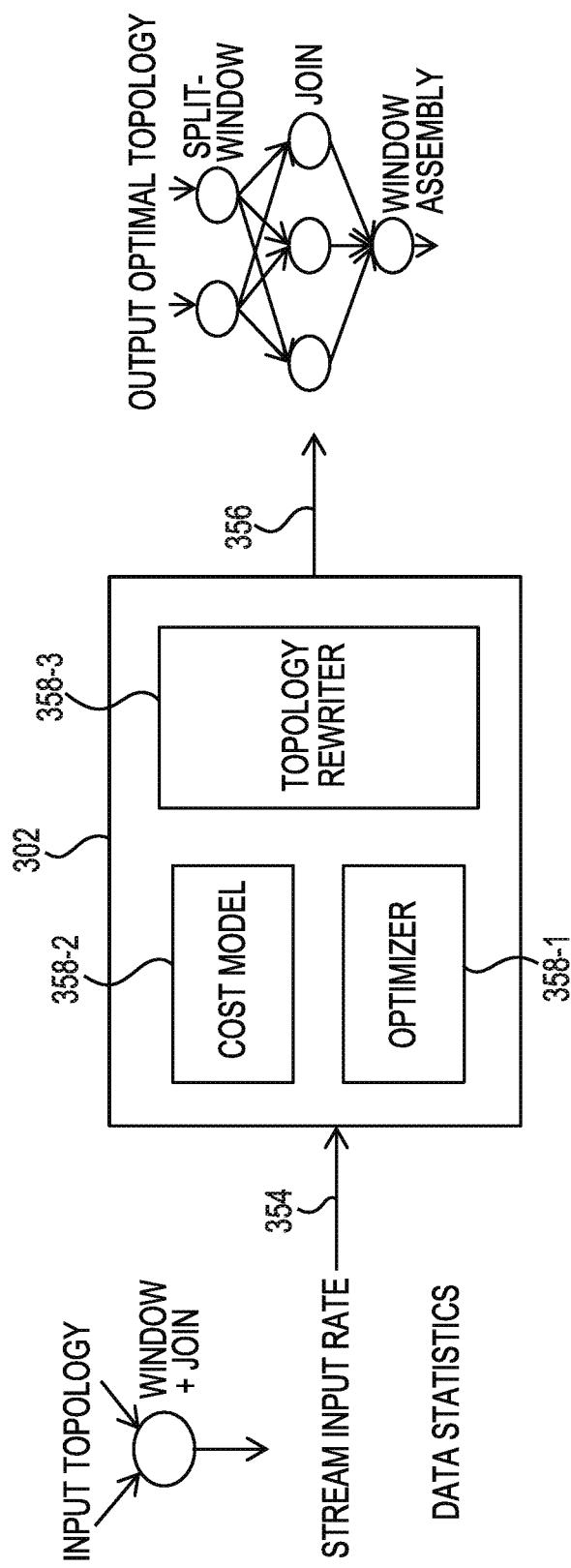
FIG. 3 illustrates a data flow including a windowed join optimizer according to the present disclosure.

FIG. 3 illustrates a data flow 352 including a windowed join optimizer according to the present disclosure. As illustrated in FIG. 3, at 354, a topology can be input (e.g., the input topology) to the window join optimization system 302. As used herein, a topology for a parallel distributed streaming system includes a number of interconnected operators, each of which performs some function and/or operation. Also, at 354, a number of parameters associated with each of the number of data streams can be input to the window join optimization system 302. For example, a stream input rate and/or data statistics about each of the number of data streams can be input to the window join optimization system 302. However, examples are not so limited, and parameters associated with each of the number of data streams can include other parameters, as discussed in relation to FIGS. 4-6. Further, while the input topology illustrated in FIG. 3 illustrates a particular topology, examples are not so limited, and the input topology can include a number of operators, at least one of which includes a join operator. That is, the input topology can include a number of interconnected operators, wherein each of the number of interconnected operators performs a particular function and/or operation, and wherein at least one of the interconnected operators performs a join function.

As illustrated in FIG. 3, the window join optimization system 302 can include a number of components (e.g., optimizer component 358-1, cost model component 358-2, and topology rewriter component 358-3). As discussed further herein, the cost model component 358-2 can calculate costs of computing a proposed join of data streams within the input topology, based on a number of model topologies. For instance, the input topology can include a number of operators, wherein at least one of the operators performs a join function between the number of data streams. The cost model component 358-2 can calculate a number of costs for performing the join function using one of the number of model topologies. Further, the optimizer component 358-2 can determine which of the number of model topologies would result in a lower cost to perform the join proposed by the input topology, and construct an optimal topology based on the calculated costs. For instance, the portion of the input topology which provided instructions on performing the join function, can be replaced by one of the number of model topologies, based on which model topology had a lower cost. That is, the input topology can, in part, be combined with a model topology to form an optimal topology. While window join optimization system 302 is illustrated in FIG. 3 to have three components (e.g., components 358-1, . . . 358-3), examples are not so limited. Window join optimization system 302 can include more or fewer components than illustrated.

As illustrated in FIG. 3, at 356, the window join optimization system 302 can output an optimal topology based on the calculated costs and the input topology. For example, the input topology can include a number of operators to perform a number of functions, wherein at least one of the functions is to perform a join. The window join optimization system 302 can analyze (e.g., calculate) costs of computing the join by implementing one of the model topologies. Based on the analysis, the window join optimization system 302 can select one of the number of model topologies for incorporation into the input topology, and output the optimal topology for execution on the parallel distributed streaming system.

Figure 4:
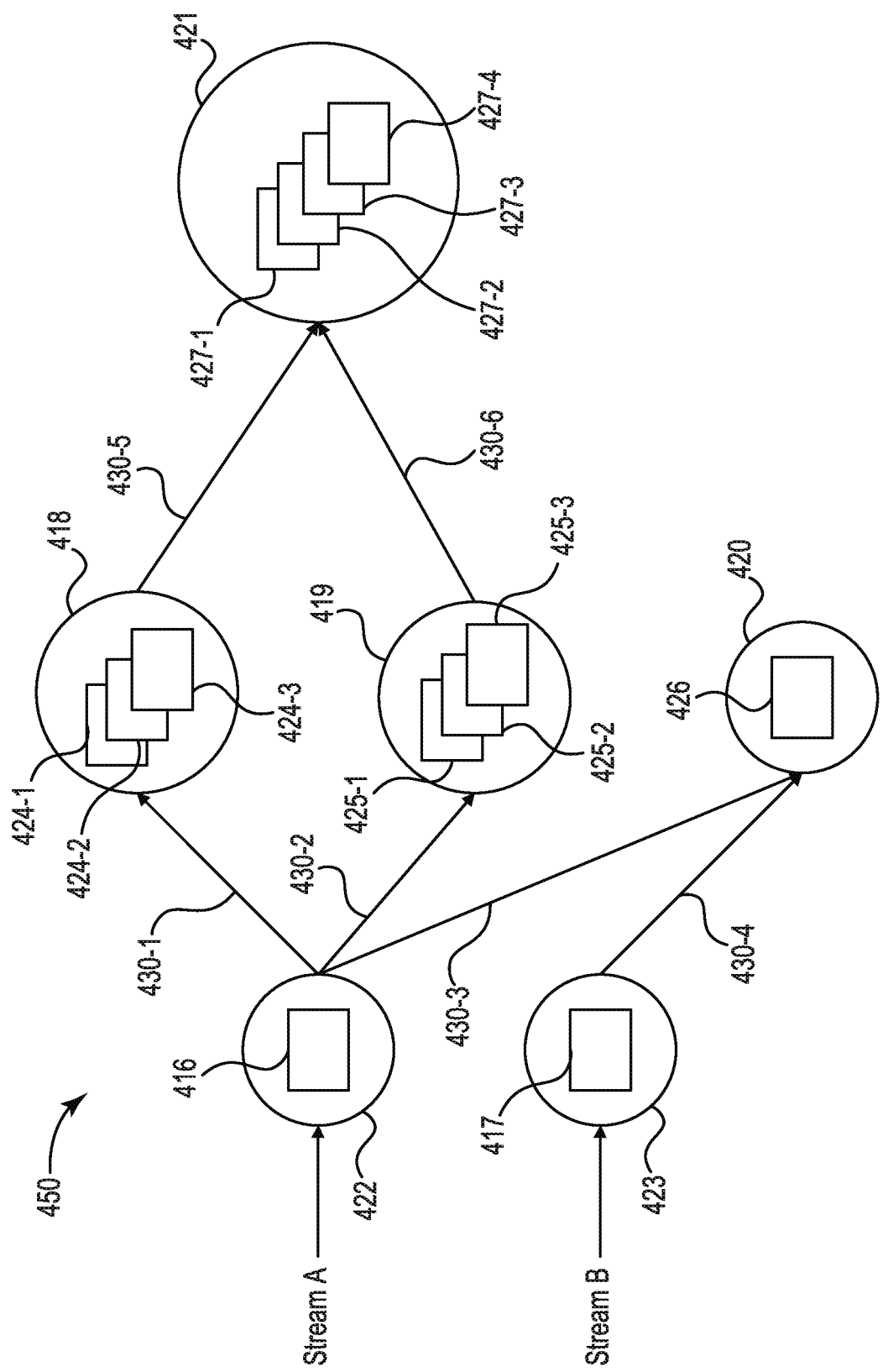
FIG. 4 illustrates a topology according to the present disclosure.

FIG. 4 illustrates a topology 450 according to the present disclosure. As illustrated in FIG. 4, a topology 450 can receive a number of data streams (e.g., stream A and stream B). Further, the topology 450 can include a number of operators (e.g., operators 418, 419, 420, 421, 422, 423) which executes a given user's logic (e.g., CRI). Each of the number of operators 418, . . . , 423, can have a number of instances. Further, each of the number of operators can be parallelizable (e.g., can be executed in parallel) in two ways. In one way, operators can execute in parallel with other operators if they belong to different parallel branches in the topology (e.g., there are no interdependencies between these operators). For example, operator 422 can execute in parallel with operator 423, and operator 418 can execute in parallel with operators 419 and 420. The second way operators can be parallelizable is by a number of instances executing in parallel. Each operator can include a number of instances (e.g., 416, 417, 424-1, . . . , 424-3, 425-1, . . . , 425-3, 426, 427-1, . . . , 427-4) that can be executed in parallel, wherein each of the number of instances can be executed by a different machine. For example, instance 424-1 can be executed by a first machine, instance 424-2 can be executed by a second machine, and instance 424-3 can be executed by a third machine. However, examples are not so limited, and a plurality of instances can be executed by a same machine. For example, instances 416, 425-2, 427-2, and 427-3 can be executed by a first machine, and instances 417, 424-2, and 425-1 can be executed by a second machine. Data can be communicated between operators 418, . . . , 423 via communication channels (e.g., 430-1, . . . , 430-6).

While each of the number of operators 418 . . . , can execute in parallel, each instance within a particular operator can execute in parallel as well. For example, instances 424-1, 424-2, and 424-3 can execute CRI in parallel. The number of instances executing in parallel to one another can be referred to as the degree of parallelism (DOP) for an operator. For example, the DOP for operator 418 can be 3, the DOP for operator 420 can be 1, and the DOP for operator 421 can be 4. As discussed in relation to FIG. 5, a number of window stream operators can be used to join a number of data streams (e.g., stream A and stream B) in an optimal way to maintain performance rates during real-time streaming.

Figure 5:
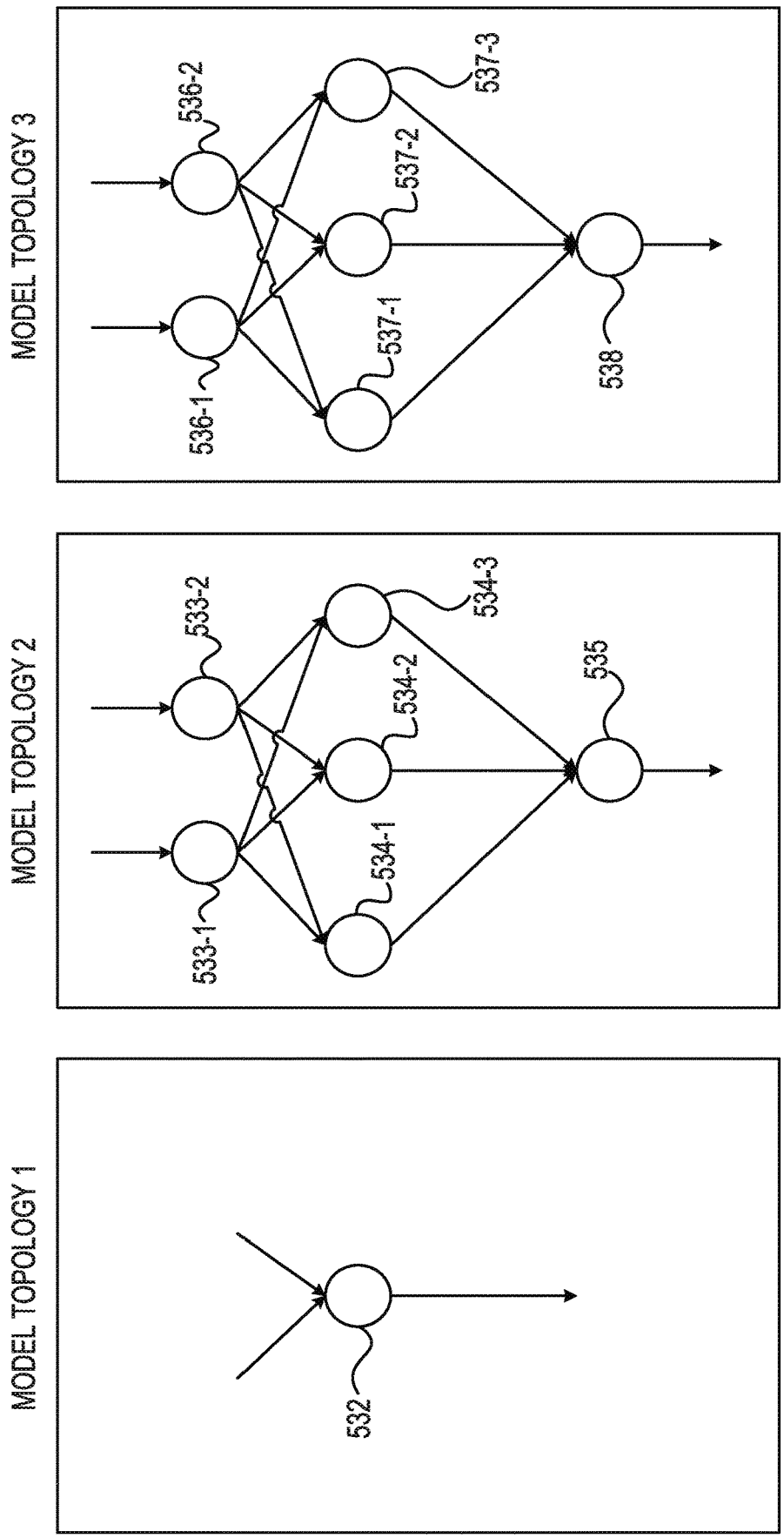
FIG. 5 illustrates a diagram of a number of model topologies for a windowed stream join according to the present disclosure.

FIG. 5 illustrates a diagram of a number of model topologies for a windowed stream join according to the present disclosure. While three model topologies (e.g., model topologies for a windowed stream join) are depicted, examples are not so limited, and other model topologies can be used. Each of the number of model topologies can include a configuration for a number of window stream operators to be executed on parallel distributed streaming system. For instance, a number of window stream operators can be used in performing a windowed stream join. A model topology can include a windowed building operator, a join operator, a window re-ordering operator, and/or a window re-assembly operator.

A window building operator, as used herein, can include an operator that receives tuples and outputs (e.g., constructs) a window and/or a number of windows of tuples. The window building operator can buffer tuples and compute a window identity (windID) based on window parameters, such as window size and/or slide size (e.g., a number and/or value denoting how the window slides and/or shifts in a data stream upon arrival of new tuples), and whether it is a time-based window or tuple-based window. As used herein, a windID can include an identification associated with a particular window. For example, a windID can be calculated by the window building operator that includes a measurement of the number of tuples in the window and/or a timestamp associated with the tuples. The window building operator can maintain (e.g., retain, hold, keep) the current windID (e.g., the last window of tuples it has received) until it receives a tuple belonging to a windID greater than the current windID. As used herein, a "highest" and/or "greater" windID refers to the last (e.g., most recent) window of tuples received by the window building operator, and/or a window with the greater number of tuples. Upon receiving a tuple belonging to a windID greater than the current windID (e.g., a newly received window), the window building operator can send the current window (e.g., the window being maintained by the window building operator) to the next operator identified in the topology, and maintain the newly received window.

A join operator, as used herein, can include an operator that receives a window of tuples from a plurality of streams which are being joined, and performs a cross-product that selects tuples including a same value in a join attribute (e.g., a join) between at least two windows that have a same windID. For example, the join operator can determine that at least two windows from the plurality of streams have the same windID (e.g., a particular value, such as 8), and can form a new window including the joined results (e.g., the tuples from the at least two windows) that has the same windID as that of the joined windows.

A window re-ordering operator, as used herein, can include an operator that receives windows of joined results (e.g., from a join operator) and sends them out (e.g., downstream) in a sorted order based on their windID. Also, a window re-assembly operator, as used herein, can include an operator that receives partial windows of joined results and merges them together to form a complete window. For example, as a result of the execution of a join operator, portions of two windows may be joined. As a result, the window re-assembly operator can merge a number of partial windows together to form a complete window.

Model topology 1, as illustrated in FIG. 5, illustrates one of a number of model topologies that may be employed for a windowed stream join. In this model topology, a window building operation and join operation can both be executed (e.g., can be running) on a same operator within the parallel distributed streaming system. For instance, operator 532 can execute both a window build operation to construct a number of windows of tuples, and a join operation to receive the constructed windows of tuples and perform a join operation on received windows. In this model topology, the degree of parallelism is 1, as a single operator is executing both operations.

Model topology 2, as illustrated in FIG. 5, illustrates another possible model topology that may be employed for a windowed stream join. In this model topology, a window building operation can be executed as a first step. Each window can then be shuffled and sent to different instances of the next operator (e.g., the next operator downstream). The following operator can then implement the join operation. The joined results from the join operator can then be sent to the next operator (e.g., the next operator downstream) which can implement the window re-ordering operation. For example, operators 533-1 and 533-2 can both execute the window building operation and create a number of windows from data streams received by the operators. Subsequently, the windows created by operators 533-1 and 533-2 can be shuffled (e.g., randomly ordered) and can be sent to operators 534-1, 534-2, and 534-3, downstream from operators 533-1 and 533-2. Operators 534-1, 534-2, and 534-3 can each execute the join operator and perform a join operation on the windows received. The joined results created by operators 534-1, 534-2, and 534-3 can then be sent to downstream operator 535 which can execute the window re-ordering operator.

Model topology 3, as illustrated in FIG. 5, illustrates another possible model topology that may be employed for a windowed stream join. In model topology 3, streams are first split by join attribute at operators 536-1 and 536-2. Next, operators 537-1, 537-2, and 537-3 can group the streams by the value of their join attribute. These operators (e.g., operators 537-1, 537-2, and 537-3) can then implement the window operation and then the join operation. Thus, each operator can include a subset of the joined result of a window. These partial windows of joined results can then be sent to the next operator (e.g., operator 538) which can implement the window re-assembly operation and window re-ordering operation.

Figure 6:
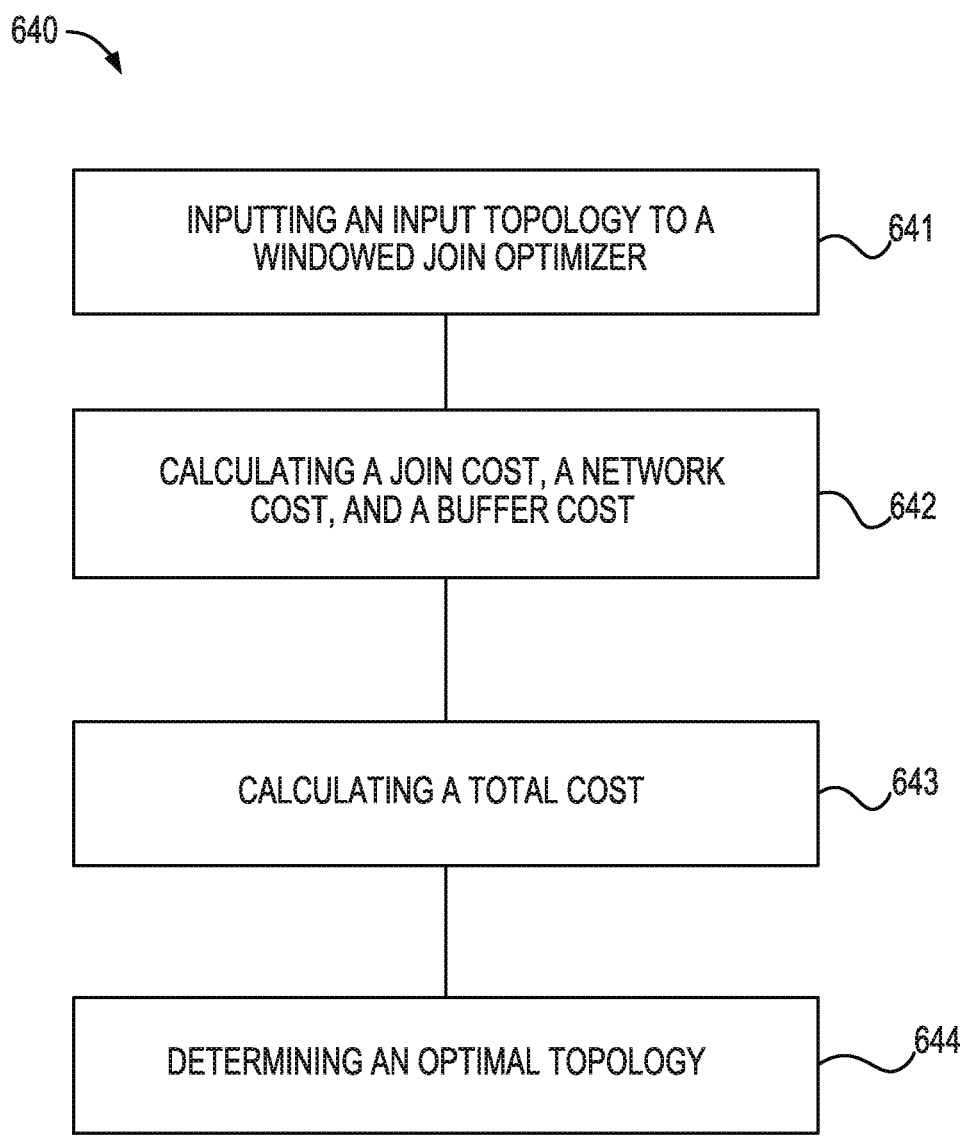
FIG. 6 is a flow chart of method for optimizing window joins over data streams according to the present disclosure.

FIG. 6 is a flow chart of a method 640 for optimizing window joins over data streams according to the present disclosure. At 641, the method 640 can include inputting an input topology for a windowed stream join to a windowed join optimizer. As discussed previously, the input topology can include one or more data stream joins. In a number of examples, a windowed join optimizer can include hardware and/or programming to function as the optimization module 214 and/or the optimization engine 104 (illustrated in FIGS. 2 and 1, respectively).

At 642, the method 640 can include calculating a join cost, a network cost, and a buffer cost for computing the windowed stream join based on a plurality of model topologies. For example, a join cost, a network cost, and a buffer cost can be calculated for performing the windowed stream join, using each of topology 1, topology 2, and topology 3, as illustrated in FIG. 5. As previously described, a join cost (e.g., a join computation cost ($C_J$)) can include the cost to compute (e.g., execute) the join for a window. Similarly, a network cost ($C_N$) can include the cost of all data shipping needed for joining one window of tuples. Further, a buffer cost (e.g., a buffer capacity ($C_B$)) can include an amount of memory needed while processing one window of tuples.

In a number of examples, calculating the number of costs can be based on a number of parameters associated with each of the number of data streams. For example, the following parameters and associated abbreviations can be used in calculating the number of costs:

λR: Rate of arrival for Right Stream (tuples/time)
λL: Rate of arrival for Left Stream (tuples/time)
WR: Right Window Size (time)
S: Right Slide Size (time)
WL: Left Window Size (time)
S: Left Slide Size (time)
Σ: Join Selectivity (0-1)
N: Cardinality of Join Attribute (Integer)
dop: Degree of parallelism (Integer)
Out-of-order: probability (0:1)
ppt: Processing time for joining one tuple with another (time)

Using the parameters above, and the model topologies illustrated in FIG. 4 as an example, the number of costs can be calculated as follows:

Topology 1:
Join Cost:

$$C_J=(\lambda_R W_R * \lambda_L W_L)*ppt$$

Network Cost:

$$C_N=\sigma(\lambda_R W_R * \lambda_L W_L)+(\lambda_R W_R+\lambda_L W_L)$$

Buffer Cost:

$$C_B=\sigma(\lambda_R W_R*\lambda_L W_L)+(\lambda_R W_R+\lambda_R W_L)+(\lambda_R W_R*\lambda_L W_L)*(\lambda_R+\lambda_L)$$

Topology 2:
Join Cost:

$$C_J=(\lambda_R W_R*\lambda_L W_L)*ppt$$

Network Cost:

$$C_N=2*(\sigma(\lambda_R W_R*\lambda_L W_L)+(\lambda_R W_R+\lambda_L W_L))$$

Buffer Cost:

$$C_B = \sigma(\lambda_R W_R * \lambda_L W_L) + (\lambda_R W_R + \lambda_R W_L) + ppt * \frac{(\lambda_R W_R * \lambda_L W_L)}{(dop)*S} * (\lambda_R W_R + \lambda_L W_L)$$

Topology 3:
Join Cost: (Uniformly Distributed Join Attribute)

$$C_J=(\lambda_R W_R+\lambda_L W_L)/dop+\text{Out-of-order}*(\lambda_R W_R+\lambda_L W_L))$$

Network Cost:

$$C_N=2*(\sigma(\lambda_R W_R+\lambda_L W_L)+(\lambda_R W_R+\lambda_L W_L))$$

Buffer Cost: (Uniformly Distributed Join Attribute)

$$C_B = \frac{W\lambda_L}{dop} + \frac{W\lambda_R}{dop} + \sigma\left(\frac{W\lambda_L}{dop} * \frac{W\lambda_R}{dop}\right) + \frac{CJ}{(dop)} * (\lambda_R + \lambda_L)$$

Therefore, the three model topologies illustrated in FIG. 5, can be evaluated in the three different dimensions of CPU time, network costs and buffer requirements as illustrated above.

At 643, the method 640 can include calculating a total cost for computing the windowed stream join using each of the plurality of model topologies. In a number of examples, calculating a total cost for each model topology can include performing a function on the number of costs. For instance, the following equation can be used:

$$C_{Total}=f(C_J,C_B,C_N);$$

wherein f can include any mathematical function. In some examples, calculating the total cost can include calculating a weighted sum of the join cost, the network cost, and the buffer cost. For instance, relative weights (e.g., numerical values indicating a level of importance) can be assigned to each of these three dimensions based on the resource criticality of an application. Thus, in a system where buffer capacity is limited, the buffer cost can be given a high relative weight in comparison to the join cost and network cost.

At 644, the method 640 can include determining an optimal topology, using the windowed join optimizer, and based on the total cost for each of the plurality of model topologies. In a number of examples, determining the optimal topology can include determining which model topology has the lowest total cost for performing the windowed stream join. In some examples, the windowed join optimizer can also determine a DOP for each of the operators included in the optimal topology. Once the model topology with the lowest total cost (e.g., the selected model topology) and/or the DOP for each operator is determined, the selected model topology can replace the join operations in the input topology to form the optimal topology. That is, the join operations in the input topology can be replaced with the selected topology, the resultant topology referred to as the optimal topology. Once the optimal topology is determined, the method 640 can include outputting the optimal topology for execution in the parallel distributed streaming system. Further, in a number of examples, the optimal windowed stream join topology can be determined in real-time.

In the present disclosure, reference is made to the accompanying drawings that form a part hereof, and in which is shown by way of illustration how a number of examples of the disclosure can be practiced. These examples are described in sufficient detail to enable those of ordinary skill in the art to practice the examples of this disclosure, and it is to be understood that other examples can be used and that process, electrical, and/or structural changes can be made without departing from the scope of the present disclosure.

The figures herein follow a numbering convention in which the first digit corresponds to the drawing figure number and the remaining digits identify an element or component in the drawing. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense.

As used herein, "logic" is an alternative or additional processing resource to perform a particular action and/or function, etc., described herein, which includes hardware, e.g., various forms of transistor logic, application specific integrated circuits (ASICs), etc., as opposed to computer executable instructions, e.g., software firmware, etc., stored in memory and executable by a processor. Further, as used herein, "a" or "a number of" something can refer to one or more such things. For example, "a number of widgets" can refer to one or more widgets. Also, as used herein, "a plurality of" something can refer to more than one of such things.

The above specification, examples and data provide a description of the method and applications, and use of the system and method of the present disclosure. Since many examples can be made without departing from the spirit and scope of the system and method of the present disclosure, this specification merely sets forth some of the many possible embodiment configurations and implementations.

What is claimed is:

1. A system for optimizing window joins over data streams, comprising:
   at least one processor; and
   a non-transitory computer readable medium storing machine readable instructions executable by the at least one processor to:
   receive an input topology is to execute a window building operation and a proposed window join of data streams within the input topology; and
   calculate a plurality of costs of computing the proposed window join of data streams within the input topology based on a replacement of the proposed window join of data streams within the input topology with model topologies, wherein the model topologies are pre-configured topologies for replacing the proposed window join of data streams in which a plurality of operators are to execute the window building operation and the proposed window join of data streams, and the plurality of costs are calculated for each of the model topologies responsive to the input topology;
   determine a total cost of computing the proposed window join of data streams for each of the model topologies based on the plurality of costs calculated for each of the model topologies; and
   replace the proposed window join of data streams within the input topology with one of the model topologies based on the plurality of costs calculated for each of the model topologies to construct an optimal topology based on the total cost,
   wherein the input topology, the model topologies, and the optimal topology each include a number of interconnected operators.

2. The system of claim 1, wherein the plurality of costs include a join cost, a network cost, and a buffer cost.

3. The system of claim 2, wherein the join cost, the network cost, and the buffer cost are based on a number of parameters of a data stream.

4. A non-transitory computer readable medium storing instructions executable by a processing resource to cause a computer to:
   input a plurality of parallel data streams and an input topology for a data stream join into a windowed join optimizer, wherein the input topology is to execute a window building operation and the data stream join within the input topology;
   analyze the input topology against a plurality of model topologies, wherein the plurality of model topologies are pre-configured topologies for replacing the data stream join in which a plurality of operators are to execute the window building operation and the data stream join;
   calculate, with the windowed join optimizer, a plurality of costs of computing the data stream join of the plurality of parallel data streams based on a modification of the data stream join with each of the plurality of model topologies and based on parameters of each of the plurality of parallel data streams;
   determine, using the windowed join optimizer and based on the plurality of costs, an optimal topology, wherein the optimal topology includes a modification of the input topology with a model topology of the plurality of model topologies that has a lowest total cost; and
   replace the data stream join within the input topology with the optimal topology among the plurality of model topologies,
   wherein the input topology, the plurality of model topologies, and the optimal topology each include a number of interconnected operators.

5. The non-transitory computer readable medium of claim 4, wherein each of the plurality of model topologies includes at least one of:
   the window building operation to construct a window of tuples;
   a join operation to receive a window of tuples from each of the plurality of parallel data streams and perform the data stream join between two windows that have a same window identity;
   a window re-ordering operation to receive windows of joined results and send the windows of joined results downstream in a sorted order based on window identity; and
   a window re-assembly operation to receive partial windows of joined results and merge them together to form a complete window.

6. The non-transitory computer readable medium of claim 5, wherein the plurality of model topologies includes a topology having the window building operation and the join operation executed by a single operator.

7. The non-transitory computer readable medium of claim 4, wherein a total cost is determined by performing a function on each of the plurality of costs.

8. The non-transitory computer readable medium of claim 7, wherein the function includes calculating a weighted sum of the plurality of costs.

9. A method for optimizing window joins over data streams, comprising:
   inputting an input topology for a windowed stream join to a windowed join optimizer, the input topology to execute a window building operation and the windowed stream join within the input topology;
   calculating a join cost, a network cost, and a buffer cost for computing the windowed stream join based on a replacement of the windowed stream join within the input topology with each of a plurality of model topologies, wherein the plurality of model topologies are pre-configured topologies for replacing the windowed stream join within the input topology in which a plurality of operators are to execute the window building operation and the windowed stream join;

calculating a total cost for computing the windowed stream join for each of the plurality of model topologies, based on the join cost, the network cost, and the buffer cost for each of the plurality of model topologies;

determining an optimal topology, using the windowed join optimizer, and based on the total cost for each of the plurality of model topologies; and replacing the windowed stream join within the input topology with one of the plurality of model topologies based on the total cost for each of the plurality of model topologies, wherein the input topology, the plurality of model topologies, and the optimal topology each include a number of interconnected operators.

10. The method of claim 9, wherein calculating the join cost includes calculating a product of a rate of arrival for a first data stream, a window size associated with the first data stream, a rate of arrival for a second data stream, and a window size associated with the second data stream.

11. The method of claim 9, wherein calculating the network cost includes calculating a sum of a rate of arrival for a first data stream, a window size associated with the first data stream, a rate of arrival for a second data stream, and a window size associated with the second data stream.

12. The method of claim 11, wherein calculating the network cost further includes calculating a product of the rate of arrival for the first data stream, the window size associated with the first data stream, the rate of arrival for the second data stream, the window size associated with the second data stream, and a join selectivity numeral.

13. The method of claim 9, wherein calculating the total cost for computing the windowed stream join using each of the plurality of model topologies includes calculating a weighted sum of the join cost, the network cost, and the buffer cost.

14. The method of claim 9, wherein determining the optimal topology is performed in real-time.

* * * * *